United States Patent [19]

Jacoby

[11] Patent Number: 4,603,720

[45] Date of Patent: Aug. 5, 1986

[54] DRIVE WHEEL FOR DRIVERLESS VEHICLE

[75] Inventor: Charles E. Jacoby, Bethlehem, Pa.

[73] Assignee: SI Handling Systems Inc., Easton, Pa.

[21] Appl. No.: 278,768

[22] Filed: Jun. 29, 1981

[51] Int. Cl.$^4$ .................. B60C 11/10; B61B 13/12
[52] U.S. Cl. ................................ 152/209 R; 104/166
[58] Field of Search .............................. 104/130, 166; 152/209 A, 209 B, 209 NT, 209 WT, 209 D, 209 R, 323

[56] References Cited

U.S. PATENT DOCUMENTS

| 582,194 | 5/1897 | Furlong | 152/209 R |
| 3,356,040 | 12/1967 | Fonden | 104/130 |
| 3,818,837 | 6/1974 | Jacoby et al. | 104/166 |
| 4,086,854 | 5/1978 | Scheel | 104/166 |
| 4,244,413 | 1/1981 | Takahashi et al. | 152/323 |

Primary Examiner—Randolph A. Reese
Attorney, Agent, or Firm—Seidel, Gonda, Goldhammer & Abbott

[57] ABSTRACT

A drive wheel for driverless vehicle has a tire portion. The tire portion has discrete recesses for enabling the tire portion to be frictionally driven by a drive shaft whose surface is wet or oily.

5 Claims, 5 Drawing Figures

U.S. Patent  Aug. 5, 1986  4,603,720
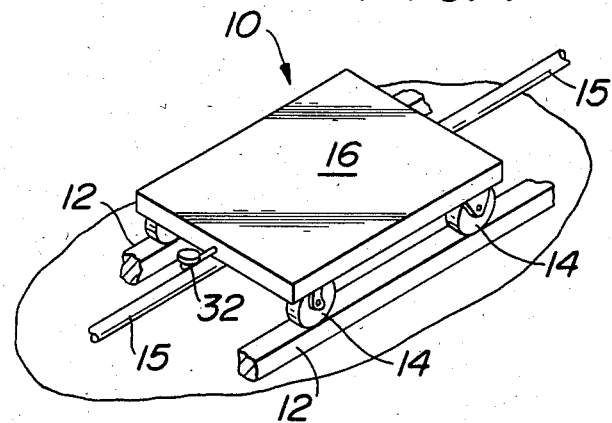
FIG. 1
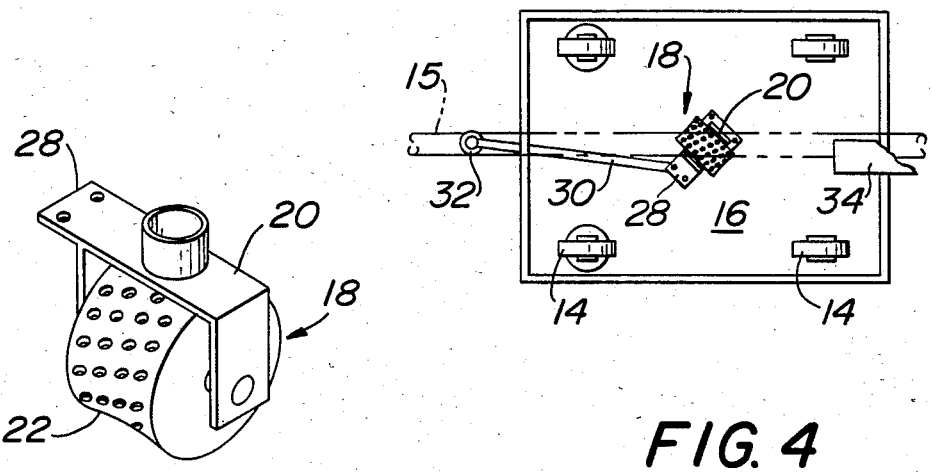
FIG. 2
FIG. 3
FIG. 4
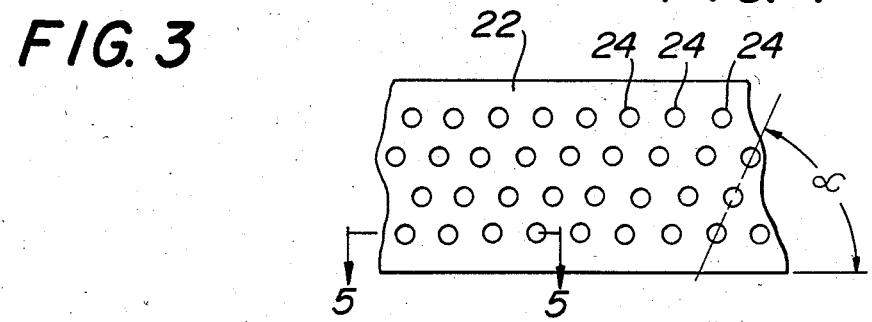
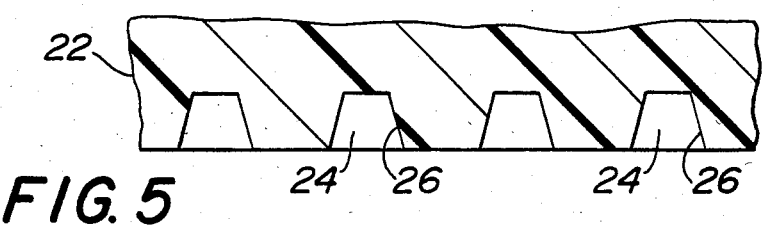
FIG. 5

4,603,720

DRIVE WHEEL FOR DRIVERLESS VEHICLE

BACKGROUND

Driverless vehicles of the type involved herein are known. See U.S. Pat. No. 3,356,040 which shows a driverless vehicle and a drive wheel spring biased into frictional contact with a drive shaft. Depending upon the angular relationship between the axis of rotation of the drive wheel and the longitudinal axis of the shaft, the vehicle will move or remain stationary. It is conventional for such vehicles to have the drive wheel spring biased to a drive position.

The standard drive wheel includes a tire portion which is a smooth surfaced polyurethane having a durameter hardness of approximately 90 Shore-A. When the drive shaft is wet or oily, the conventional tire portion tends to "plane" or slide on the surface and insufficient frictional force is transmitted to drive the vehicle.

In order to solve the problem, a steel tire was tried and was partially successful because the hard surface of the steel tire would break through the liquid film on the drive shaft and provide metal to metal contact. The disadvantage of using a steel tire was excessive wear on the drive tube.

Other materials and constructions of tires were tried. Transverse and circumferential grooves were each tried on the tire portion without success. Tires were molded using 50% polyurethane and 50% of a commercially available oil absorbent material. At first, the tire did not perform satisfactorily. Thereafter, it did provide adequate drive force. The tire was removed and inspected. It was noted that the absorbent material exposed on the periphery of the tire had eroded away. Thereafter, recesses were drilled on the periphery of a conventional drive wheel having a polyurethane tire which performed very well thereby confirming that the solution to the problem was the recesses.

SUMMARY OF THE INVENTION

The present invention comprises a drive wheel for a driverless vehicle. The drive wheel has a tire portion adapted for frictional contact with a drive shaft. The tire portion has means thereon for enabling the tire portion to be frictionally driven by a drive shaft whose surface is wet or oily.

It is an object of the present invention to provide a solution to the problem of how to attain sufficient frictional contact between a wheel adapted to be frictionally driven by a shaft whose surface is wet or oily.

It is another object of the present invention to provide a drive wheel for a driverless vehicle which is capable of being driven by a drive shaft whose surface is dry, wet or oily and in a manner which is simple, inexpensive and reliable.

Other objects and advantages will appear hereinafter.

For the purpose of illustrating the invention, there is shown in the drawings a form which is presently preferred; it being understood, however, that this invention is not limited to the precise arrangements and instrumentalities shown.

FIG. 1 is a perspective view of a typical driverless vehicle incorporating the present invention.

FIG. 2 is a bottom plan view of the vehicle shown in FIG. 1.

FIG. 3 is a partial perspective view of a drive wheel in accordance with the present invention.

FIG. 4 is a partial view of the periphery of the drive wheel showing the recess pattern.

FIG. 5 is a sectional view taken along the line 5—5 in FIG. 4 but on an enlarged scale.

DETAILED DESCRIPTION

Referring to the drawings in detail, wherein like numerals indicate like elements, there is shown in FIG. 1 a driverless vehicle in accordance with the present invention designated generally as 10. The vehicle 10 includes conventional support wheels 14 attached to the bottom surface of a platform 16. The wheels 14 ride on rails 12. As shown more clearly in FIGS. 2 and 3, the vehicle 10 includes a drive wheel 18 which is frictionally driven by a drive shaft 15 disposed between the rails 12.

As is conventional in the art, the drive wheel 18 is spring biased into contact with the drive shaft 15 and is also spring biased to a drive position. In the drive position, the drive wheel rotates about an axis disposed at an acute angle of about 40°–45° with respect to the longitudinal axis of the drive shaft 15. The drive wheel 18 includes a yoke 20 which is associated with the springs referred to above in a conventional manner.

The tire portion 22 of the drive wheel 18 is solid plastic and is provided with a plurality of discrete recesses 24 on the outer periphery adapted to be driven by frictional contact with shaft 15. As shown more clearly in FIG. 4, each of the recesses is completely surrounded by land area. A preferred pattern of the recesses is shown in FIG. 4 wherein the recesses 24 are in rows disposed at an angle alpha with respect to a side face of the tire portion 22. The preferred angle alpha is in the range of 60°–70°.

The tire portion 22 is preferably a polymeric plastic such as polyurethane. The preferred dimensions for the recesses 24 for use with a 3½ inch diameter drive shaft are as follows. The recesses are ¼ inch in diameter at the outer peripheral surface of tire portion 22 and have a depth of 3/16 inch while the side walls 26 converge inwardly at an angle of approximately 15° from the radius. Thus, maximum diameter and depth of the recesses were approximately equal. The recesses 24 are preferably frusto-conical with the larger diameter end being at the outer peripheral surface of the tire portion 22. The frusto-conical shape of the recesses 24 resists dirt and other debris from packing the recesses. The above dimensions may increase as the diameter of the drive shaft increases.

A bracket 28 is attached to the yoke 20 to facilitate rotation of the drive wheel 18 between drive and rest positions. Bracket 28 can perform its function by contact with a cam between the tracks 12 and/or may be part of an accumulation device as taught by U.S. Pat. No. 3,818,837. As shown, bracket 28 is pivotably connected to one end of drive control 30 which projects forwardly of vehicle 10 and terminates in a cam follower 32. A cam 34 is attached to the trailing end of platform 16. When cam follower 32 contacts a cam 34 on another vehicle stationary along the tracks 12, the drive wheel 18 will be rotated against spring pressure to an accumulation position whereby vehicle 10 will stop.

The recesses 24 need not be circular as shown but may be rectangular, triangular, diamond-shaped, etc. The recesses 24 are preferably molded in tire portion 22 by appropriately shaped projections on the mold surface.

The exact theory which causes the recesses 24 to enable the drive wheel 18 to be frictionally driven by the drive shaft whose outer surface is wet or oily is not known for certain. It is believed that water or oil on the drive shaft 15 is squeezed by the tire portion 22 into the recesses 24 and is gathered therein with sufficient mass to be thrown off the surface by rotational frictional contact. Although the vehicle 10 may momentarily stall, the cleaning action of the tire portion 22 as it rotates against the drive tube 15 quickly restores the friction to attain the necessary driving force to propel the vehicle 10. The recesses 24 do not detract from use of the drive wheel 18 with a drive shaft whose surface is dry.

As a result of the present invention, it is possible to provide conveyor systems with driverless vehicles propelled by drive shafts in an area exposed to water or other liquids, oil spray, etc. Heretofore, a conventional driverless vehicle could not be utilized in such environments.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus comprising a drive wheel for a driverless vehicle, said drive wheel having a solid plastic tire portion, said tire portion having an outer peripheral surface adapted for frictional contact with a drive shaft, said tire portion having means for expelling liquid from the surface of a drive shaft, said means including rows of discrete recesses on the outer peripheral surface of said tire portion with each recess being completely surrounded by land area, the space between rows being at least as large as the transverse dimensions of the recesses at said outer peripheral surface of the tire portion.

2. Apparatus in accordance with claim 1 wherein said rececesses are frusto-conical with the larger diameter end being at the outer peripheral surface of the tire portion to thereby resist packing of the recesses with direct or other foreign matter.

3. Apparatus in accordance with claim 1 including each row being at an acute angle of approximately 60°–70° with respect to a side face of the tire portion.

4. Apparatus in accordance with claim 1 wherein said recesses on said surface extend radially inwardly for a depth of about 3/16 inch.

5. Apparatus in accordance with claim 1 wherein said recesses are frustum-shaped with the larger transverse dimension end being at the outer peripheral surface of the tire portion to thereby resist packing of the recesses, said recesses extending radially inwardly for a depth corresponding to approximately the largest transverse dimension of the recesses.

* * * * *